United States Patent Office 3,466,844
Patented Sept. 16, 1969

3,466,844
PACKAGING APPARATUS
Laurie M. Reid, James V. Ferguson, and Walter R. McDurmont, Birmingham, Ala., assignors to Anderson Electric Corporation, Leeds, Ala., a corporation of Alabama
Filed Sept. 29, 1967, Ser. No. 671,698
Int. Cl. B65b 9/12, 51/30
U.S. Cl. 53—182                     15 Claims

ABSTRACT OF THE DISCLOSURE

A packaging machine in which a center-folded web of flexible heat-sealable sheet plastic material is intermittently fed forward in package length intervals, with a dwell between successive feed cycles, the web having its center fold at the bottom, thereby being of trough formation. The web first traverse a loading station and then a sealing station. During each dwell, an article is dropped into the center-folded web, spaced one package length interval from the preceding article with a gap therebetween. Extending through the loading station is a horizontal conveyor for supporting the articles in the web and a pair of endless side conveyors for engaging the outside opposite sides of the web for feeding the web forward. The side conveyors are mounted for lateral inward and outward movement on a parallelogram linkage assembly and are spring-biased toward engagement with the side walls of the web.

Background of the invention

This invention involves an improvement on the packaging machine shown in the coassigned McKay et al. U.S. Patent 3,331,185, issued July 18, 1967, entitled Wrapping Machine. The machine shown in said patent generally comprises means for intermittently feeding forward in single package length increments a centerfolded web of flexible heat-sealable sheet plastic material with the center-folded web positioned vertically and with its center fold at the bottom, so that the web is of trough form. The center-folded web is led through a loading station and thence to a sealing station. It dwells for an interval between successive feed cycles. During each dwell, an article is dropped into the web at the loading station, and sealing means, in the form of an inverted L, at the sealing station close on the web to form a top seal and a trailing end seal across the web between the leading article in the web and the article at the loading station. Machines such as shown in said U.S. Patent 3,331,185 have been fully satisfactory for many purposes, but difficulties are sometimes encountered with proper feeding of the web when relatively heavy articles are being packaged. This difficulty generally arises due to stretching and deforming of the web under the weight of the article, to tilting of the web and the article to one side or the other, and to the inability of the web to advance the article from the loading station to the sealing station.

Summary of the invention

Among the several objects of the invention may be noted the provision of an improvement on the machine shown in said U.S. Patent 3,331,185, enabling it to handle the packaging of heavier products; the provision of such a machine in which the web carrying the articles is supported along its bottom through the loading and sealing stations; and the provision of such a machine in which the web is maintained vertical and is positively driven forward from the loading to the sealing station. In addition, the present machine is characterized by simplicity of construction, low cost and ease of operation and use.

In general, this is attained by intermittently feeding forward a continuous length of packaging material having two opposed walls extending upward, joined along the bottom margin of the material and open along the top longitudinal margin, through a station at which articles to be packaged may be inserted between the walls with the particles spaced at package length intervals, and with spaces between successive articles. A horizontal conveyor extends through the station for supporting the material with the articles therein at the bottom and a pair of endless conveyors extend through the station and engage the outside of the walls for feeding the material forward. In addition, means is provided for sealing the opposed walls of the material together to enclose the articles. Other objects and features will be in part apparent and in part pointed out hereinafter.

Brief description of the drawings

FIG. 6 is a section on line 6—6 of FIG. 4;
and
FIG. 7 is a section on line 7—7 of FIG. 4.
Corresponding reference characters indicate corresponding parts throughout the several views of the drawings.

Description of the preferred embodiment

Figure 1:
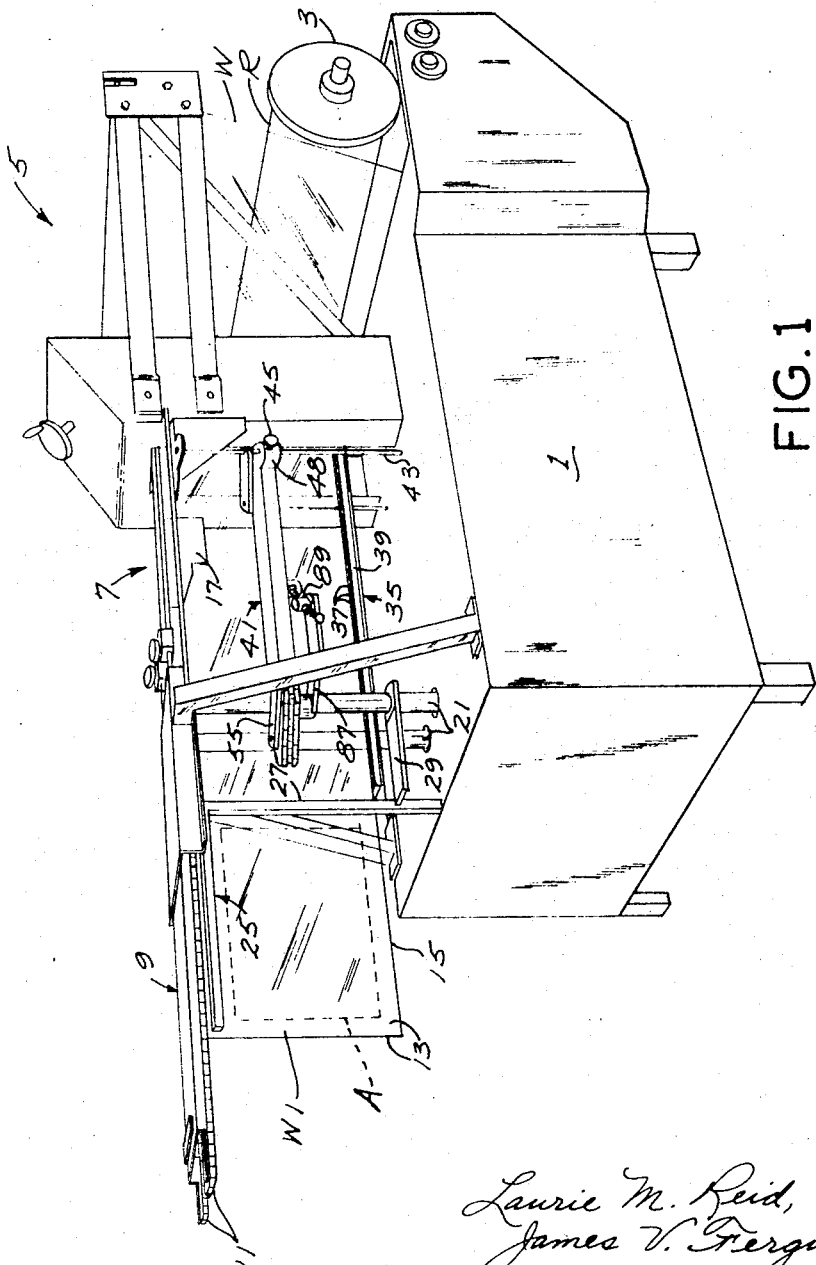
FIG. 1 is a front perspective showing a machine of the general type disclosed in said U.S. patent 3,331,185 equipped with means of this invention for supporting and feeding heavy packages.
Figure 2:
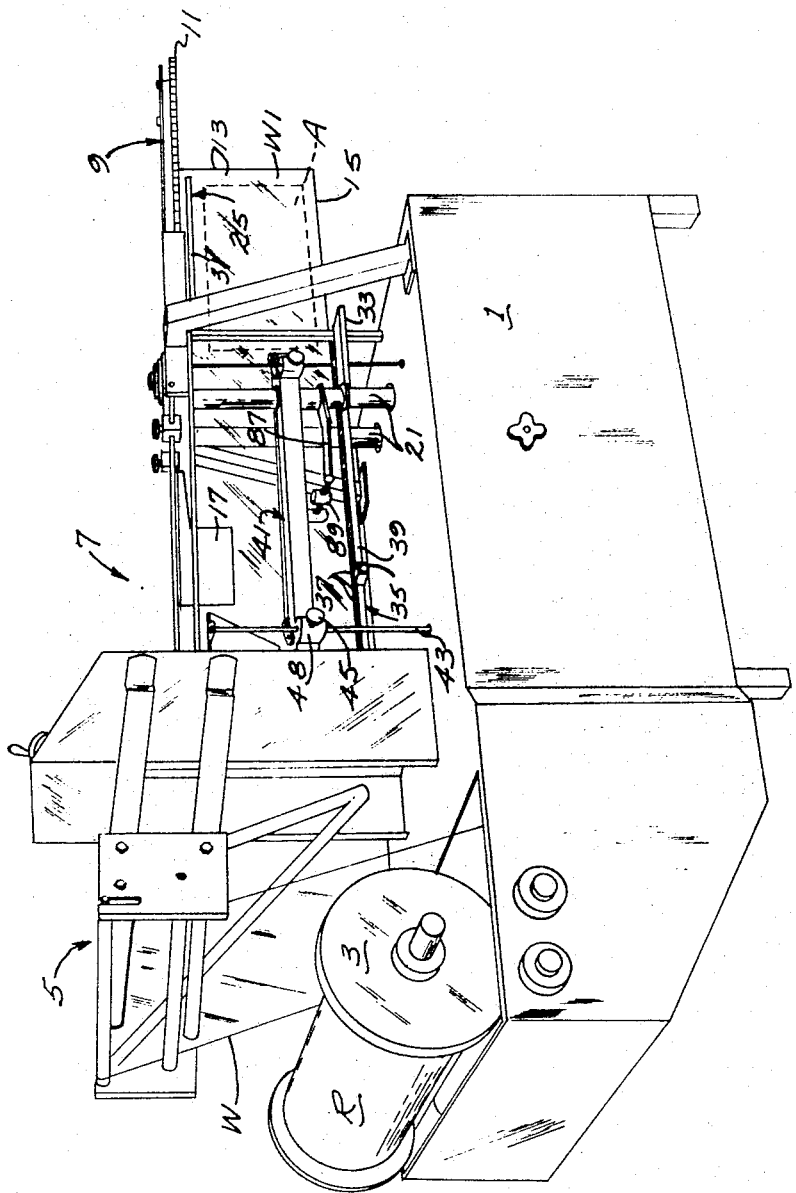
FIG. 2 is a rear perspective of the machine of FIG. 1.

Referring to the drawings, a packaging machine which has the present invention incorporated therein is shown in FIGS. 1 and 2 generally to comprise a base 1 having at one end thereof, hereinafter referred to as its rearward end, means 3 for supporting a roll R of a web W of flexible heat-sealable sheet plastic material, e.g., polyethylene film. These correspond to the base and roll holder indicated at 32 and 34 in said U.S. Patent 3,331,185. The web is unwound from the roll and is fed through a center-folding unit generally indicated at 5 (corresponding to assembly 36 shown in said patent) in which the web is center-folded with the folded web positioned vertically with its center fold at the bottom, thereby being of trough formation, open at its top. The center folded web, designated W1, then passes forward through a loading zone or station 7. Forward of the loading station is a web feed unit 9 (corresponding to that indicated at 40 in said patent) for intermittently feeding the web forwad with a dwell between successive feed cycles. This web feed unit 9 comprises a pair of endless chains 11 (corresponding to chains 184 and 188 shown in said patent) having opposed inner reaches which grip the top margin of the center-folded web and which are intermittently driven for effecting the intermittent forward feed of the web. At the loading station 7, on each cycle of the machine, an article A (generally of square outline and relatively thin in profile) is dropped into the center-folded web between the opposed side walls 13 of the web, spaced behind the preceding article one package length increment, with a gap between the articles. The center fold of the web, at which the opposed walls of the web are joined, is indicated at 15. The opposed walls 13 of the web pass on the outside of spacer plates 17 at the loading station for holding the side walls apart for loading.

Figure 3:
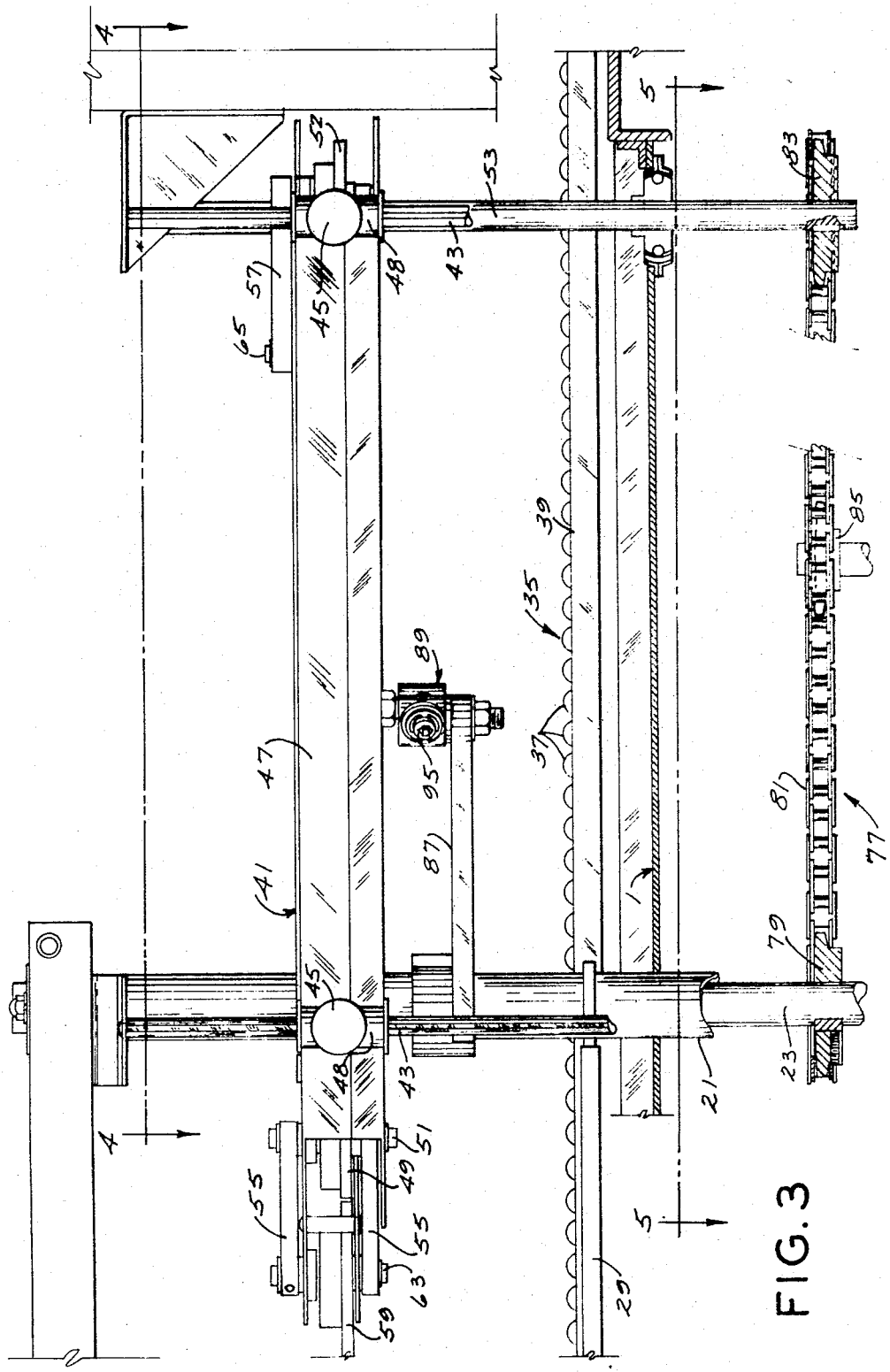
FIG. 3 is a view in elevation of a portion of the machine of FIG. 1, with parts shown in section.
Figure 4:
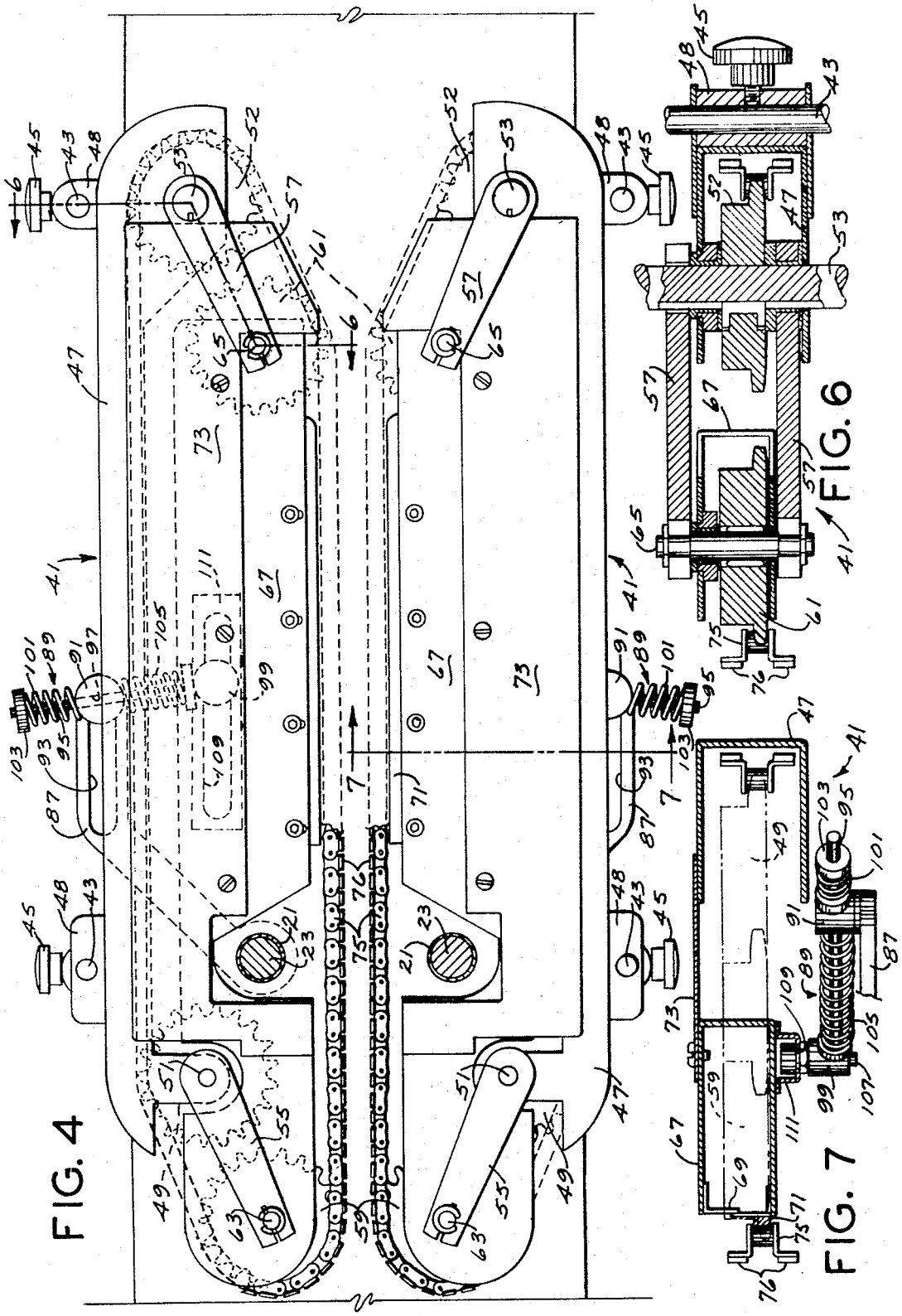
FIG. 4 is a section on line 4—4 of FIG. 3.
Figure 5:
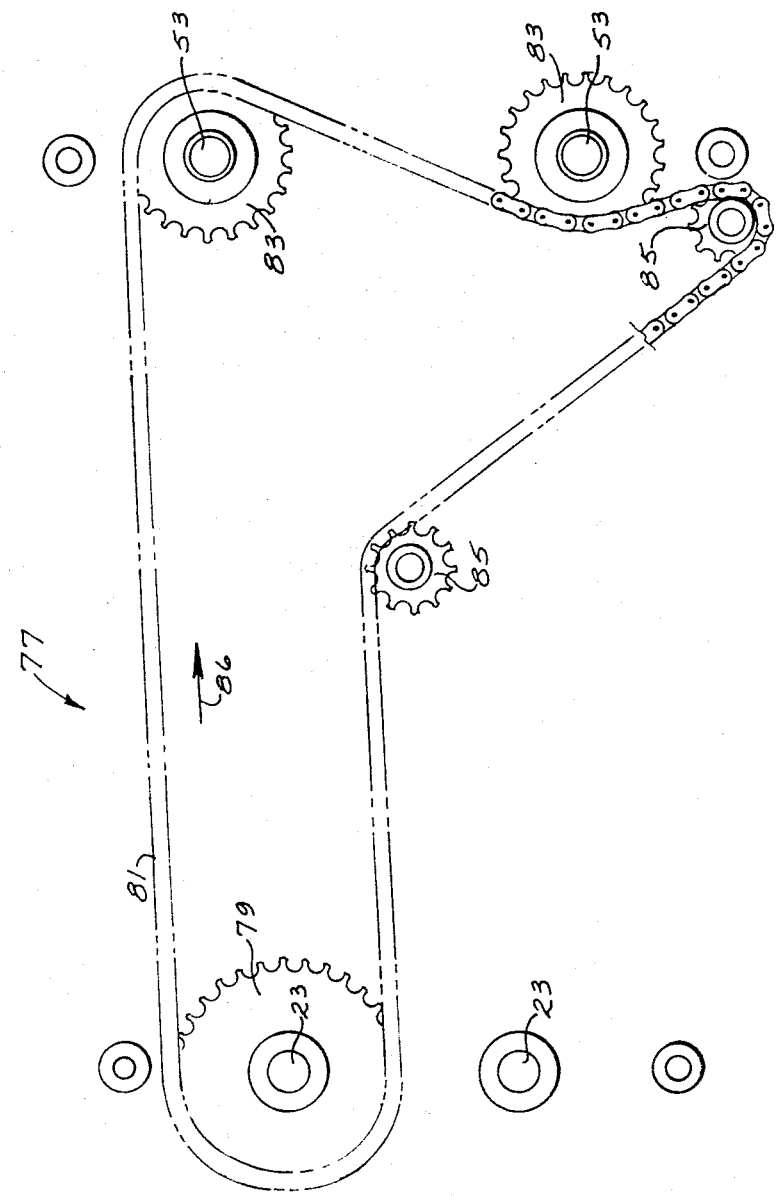
FIG. 5 is a section on line 5—5 of FIG. 3.

Extending vertically upward from the base adjacent its forward end are two tubular rock shafts constituted by sleeves 21. These correspond to sleeves 412 and 206 shown in said patent. Extending through these tubular rock shafts 21 are chain drive shafts 23 (FIGS. 3 and 4)

which, at their upper end, carry drive sprockets for the chains 11. These chain drive shafts 23 correspond to shafts 362 and 354 shown in said patent. Shafts 23 are intermittently driven by an adjustable drive mechanism housed in the base 1 for intermittently feeding the web forward. Full details of this mechanism may be ascertained from said patent. Sleeves 21 are oscillated by cam mechanism housed in the base 1 during each dwell of the shafts 23 and the chains 11 for effecting sealing of the web. Full details of this cam mechanism may be ascertained from said patent.

The mechanism for intermittently driving the shafts 23 and the chains 11 is adjusted for effecting intermittent forward feed of the web in package length increments. Sealing means, designated in its entirety by the reference numeral 25, is located below chains 11 and comprises a hot-wire sealing jaw assembly 27 mounted on one of the rock shafts by a bracket 29 and a back-up sealing jaw assembly 31 mounted on the other rock shaft by a bracket 33, these jaw assemblies being movable toward and away from one another via the oscillation of shafts 21. This sealing means corresponds to the sealing means 42 in said patent. Although the sealing means 25 illustrated and described is of generally L-shaped configuration for sealing one package during each dwell of the machine, it should be noted that an F-shaped sealing means may be used for sealing two packages during each dwell. This type of sealing means is illustrated and described in the coassigned and copending U. S. patent application of Reid et al., Serial No. 663,837, filed August 28, 1967.

In carrying out this invention for use of the packaging machine with heavy articles, a horizontal conveyor 35 is provided extending through the loading station to the sealing station for supporting the web W1 with the articles A at the bottom of the web. This conveyor may consist, for example, of a plurality of rollers 37 individually journalled in a U-channel 39 supported on base 1. This conveyor engages the bottom center fold 15 of the web W1 and supports the web with the articles A therein, thereby preventing stretching and deformation of the web under the weight of heavy articles as they advance through the loading and sealing stations.

Also in carrying out this invention for use of the packaging machine with heavy articles, a pair of side conveyors 41 is provided extending through the loading stations for engaging the outside of the walls 13 of the web W1 with the articles A therein. These side conveyors feed the web through the loading station to the sealing station where the web is engaged by the chains 11. The conveyors are positioned on opposite sides of the web W1 and are supported in any desired position of vertical adjustment be means of vertically extending posts 43 and set screws 45.

As best illustrated in FIGS. 3–7, each of the side conveyors 41 comprises an outer channel member 47 having its open side facing inward toward the web W1. This channel carries vertical collars 48 at its ends for receiving the post 43 to vertically locate and support the side conveyors 41. A first sprocket 49 is journalled on a stud shaft 51 between the flanges of the channel 47 at its forward end. Similarly, a second sprocket 52 is journalled on a shaft 53 between the flanges of channel 47 at its rear end, the shaft 53 extending down into the base 1 of the machine for driving the conveyor, as will appear. A pair of end links 55 and 57, respectively pivotally carried by the shafts 51 and 53, straddle the sprockets 49 and 52. The links 55 carry a third sprocket 59 at their ends and the links 57 carry a fourth sprocket 61 at their ends. These sprockets are journalled on stub shafts 63 and 65, respectively. An inner channel member 67 having its open side facing inward toward the web W1 is carried by the shafts 63 and 65 between the respective sprockets and links 59, 55 and 61, 57. This channel has a two-piece flange member 69 (FIG. 7) partially closing its open side, the flange member carrying a rail 71 at its lower edge. A cover plate 73 is secured to the channel 67 and overlies the channel 47.

An endless chain 75 is trained around the sprockets 61, 52, 49 and 59 with its inner reach extending parallel to and adjacent the web W1 and its outer reach extending parallel to but spaced from the web. The linkage assembly constituted by channels 47 and 67 and links 55 and 57 is a parallelogram linkage which maintains the inner reach of the endless chain 75 parallel to the web W1 irrespective of its distance therefrom. Rubber pads 76 are secured to each of the links of chain 75 for gripping the web W1.

The chains 75 are driven for simultaneous movement with the chains 11 by means of a sprocket and chain drive assembly indicated generally at 77 (FIGS. 3 and 5) within base 1. As will be noted, one of the shafts 23 (the upper end of which drives the chains 11) has a sprocket 79 fixed thereto for driving a chain 81 trained around a pair of sprockets 83 fixed to the shafts 53 for driving the conveyors 75 via the sprockets 52. Idler sprockets 85 are provided for guiding the chain 81 for travel in the direction indicated by arrow 86. The endless chain conveyors 75 are driven in synchronism with the chains 11 by the intermittent drive mechanism connected to shaft 23. As set forth hereinabove, this intermittent drive mechanism is described in said U.S. Patent 3,331,185.

The channel members 67 of the side conveyors 41, which carry the inner reaches of chains 75, are movable inward and outward, while remaining parallel to one another by reason of the parallelogram linkage arrangement for the purposes of engagement with the sides of the web W1 for feeding it forward and disengagement therefrom for discontinuing the feed and allowing for insertion of articles. As to each channel member 67, mechanism for moving it inward and outward is shown to comprise a rocker arm 87 extending from a respective rock shaft 21, and a resilient linkage generally designated 89 interconnecting the rocker arm and the channel member. This linkage 89 comprises a block 91 pivotally and adjustably mounted in a slot 93 in the rocker arm. A rod 95 extends slidably through a transverse hole 97 in the block and carries a head 99 at its inner end. A coil compression spring 101 surrounds the rod between the block 91 and a collar 103 at the outer end of the rod, and a coil compression spring 105 surrounds the rod between the block 91 and the head 99. The latter has a vertical hole pivotally receiving a pin 107 adjustably secured in a slot 109 in a member 111 secured to the bottom of the channel member 67. This arrangement is such that, on oscillation of the rock shafts 21, channel members 67 (and the inner reaches of chains 75) are moved laterally inward and outward a distance dependent upon the adjustment of blocks 91 in slots 93 and heads 99 in slots 109. The springs 101 and 105 provide for resilient interengagement between the inner reaches of the chains and the web with the articles therein. As set forth hereinabove, the cam drive mechanism for oscillating the rock shafts 21 is described in said U.S. Patent 3,331,185.

Operation is as follows:

On each dwell of the center-folded web W1, shafts 21 are rocked in the direction to effect closing of the L-shaped seal jaws 27 and 31 on the web. Rocking of shafts 21 causes the rocker arms 87 to pivot outwardly away from the web W1, thereby pivoting the inner channels 67 about shafts 51 and 53. This causes the inner reaches of the endless chain conveyors 75 to swing outward away from the web W1 and to become disengaged therefrom, thereby to discontinue driving the web during the sealing operation and to allow opening up of the web for insertion of articles between the sides 13 of the web at the loading station.

During this dwell of the web W1, the horizontal portion of the sealing bars forms a top seal for the leading packages at the leading (forward) end of the web, and the transverse portion of the sealing bars form a trailing transverse seal for the leading package and a leading transverse seal for the next package. This portion of the seal bar also effects severing of the web on a transverse line intermediate the trailing transverse seal for the first package and the leading transverse seal for the second package. The first package will already have a leading transverse seal at the forward end of the web as a result of the previous cycle.

The shafts 21 then rock back to effect opening of the seal jaws 27 and 31 and inward swinging movement of the inner channels 67 via the rocker arms 87. The resilient linkages between arms 87 and channels 67 permit resilient engagement of the inner reaches of the conveyor chains 75 with the outside of the opposite walls of the web W1. On opening of the seal members and closing of the side conveyors, shafts 23 are actuated to drive the chains 11 for feeding the web forward. This causes the chain and sprocket drive assembly 77 to rotate shafts 53 thereby rotating the sprockets 52 to drive the side conveyor chains 75. The combined operation of chains 11 and 75 feet forward the web W1 one package length interval, and, during the ensuing dwell, the seal bar members are closed and the side conveyors are opened to form the next package, and so on.

Thus, when the rock shafts 21 rock to close the seal jaws, the side conveyors open, and when the rock shafts rock to open the seal jaws, the side conveyors close. When the side conveyors open, shafts 23 stop rotating. When the side conveyors close, shafts 23 are rotated and drive chains 11 and 75 to feed the web W1 forward one package length for the next sealing and loading operation. Since the side conveyors are resiliently carried on arms 87, they close gently on the web and accommodate articles of various thicknesses. In addition, the horizontal conveyor supports the web and articles and the side conveyors prevent their tilting toward one side or the other.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Packaging apparatus comprising means for intermittently feeding forward a continuous length of packaging material having two opposed walls extending upward, joined along the bottom margin of the material and open along the top longitudinal margin, through a station at which articles to be packaged may be inserted between said walls with the articles spaced at package length intervals, and with spaces between successive articles, a horizontal conveyor extending through said station for supporting said material with the articles therein for supporting said material with the articles therein at the bottom, a pair of endless side conveyors extending through said station engageable with the outside of said walls for feeding the material forward, and means for sealing together the opposed walls of the material to enclose the articles.

2. Apparatus as set forth in claim 1 wherein said side conveyors are resiliently engageable with the material.

3. Apparatus as set forth in claim 1 wherein the side conveyors are mounted for lateral inward and outward movement.

4. Apparatus as set forth in claim 3 wherein said side conveyors are resiliently engageable with the material.

5. Apparatus as set forth in claim 3 wherein each of said side conveyors comprises a parallelogram linkage having a fixed outer member and a movable inner member, said members extending generally parallel to said packaging material.

6. Apparatus as set forth in claim 5 wherein each linkage includes links pivotally connecting the inner and outer members thereof for swinging movement of the inner member with respect to the outer member, sprockets carried by the links, and an endless chain extending around the sprockets.

7. Apparatus as set forth in claim 6 wherein said means for sealing comprises a pair of seal jaws mounted on rock shafts for swinging movement about a vertical axis into and out of engagement with said packaging material.

8. Apparatus as set forth in claim 7 further comprising arms on said rock shafts linked to said inner members for moving the inner reaches of the chains toward one another when the seal jaws open and for moving the inner reaches of the chains away from one another when the seal jaws close.

9. Apparatus as set forth in claim 8 further comprising means interconnecting said intermittent feed means and said endless chains for driving said chains when engaging said material and for discontinuing same when disengaged.

10. Packaging apparatus comprising a pair of vertical rock shafts, means for intermittently feeding forward a center-folded web of flexible heat-sealable sheet plastic material between said shafts with the web arranged vertically and with its center fold at the bottom, said web having articles to be packaged inserted therein spaced at package length intervals at a loading station rearward of said rock shafts, said web feeding means being located forward of said rock shafts and being adapted to grip the top of the web and intermittently to feed the web forward, with a dwell between successive feed cycles, means connected to said rock shafts extending forward of said rock shafts below said feeding means mounted for inward and outward movement to seal the opposite side walls of said web together to enclose said articles, a horizontal conveyor extending through said loading station for supporting said web with the articles therein at the bottom, and a pair of endless side conveyors extending through said loading station engageable with the outside walls of said web for feeding the web through said loading station, said side conveyors being connected to said rock shafts for lateral inward and outward movement.

11. Apparatus as set forth in claim 10 wherein said side conveyors are resiliently engageable with the web.

12. Apparatus as set forth in claim 10 wherein each of said side conveyors comprises a parallelogram linkage having sprockets at its corners, and an endless chain trained around said sprockets, one of said sprockets being connected to said web feeding means for intermittently driving said chain in any position thereof.

13. Apparatus as set forth in claim 12 wherein each linkage comprises an outer fixed channel and an inner movable channel, said channels extending generally parallel to said web.

14. Apparatus as set forth in claim 13 wherein each linkage further comprises links pivotally connecting the inner and outer channels thereof for swinging movement of the inner channel with respect to the outer channel.

15. Apparatus as set forth in claim 14 further comprising arms on said rock shafts linked to said inner channels for moving the inner reaches of the chains toward one another when the seal means open and for moving the inner reaches of the chains away from one another when the seal means close.

References Cited

UNITED STATES PATENTS

| | | | |
|---|---|---|---|
| 2,913,862 | 11/1959 | Sabee | 53—180 X |
| 2,923,111 | 2/1960 | Selock | 53—180 X |
| 3,331,185 | 7/1967 | MacKay et al. | 53—180 |

THERON E. CONDON, Primary Examiner

E. F. DESMOND, Assistant Examiner